US009183071B1

(12) United States Patent
Estell et al.

(10) Patent No.: US 9,183,071 B1
(45) Date of Patent: Nov. 10, 2015

(54) SYSTEM AND METHOD FOR AUTOMATED HARDWARE COMPATIBILITY TESTING

(71) Applicant: Leidos, Inc., Reston, VA (US)

(72) Inventors: Timothy William Estell, Ellicott City, MD (US); Bruce Allen Clark, Eldersburg, MD (US); Littleton Kent Riggins, Silver Spring, MD (US); Jeffrey Errol Cade, Elkridge, MD (US); Ronald Franklin Cox, Millersville, MD (US); Martin William Sutton, Jr., Brooklyn Park, MD (US)

(73) Assignee: Leidos, Inc., Reston, VA (US)

( * ) Notice: Subject to any disclaimer, the term of this patent is extended or adjusted under 35 U.S.C. 154(b) by 158 days.

(21) Appl. No.: 14/093,782

(22) Filed: Dec. 2, 2013

(51) Int. Cl.
*G06F 11/00* (2006.01)
*G06F 11/07* (2006.01)

(52) U.S. Cl.
CPC .................................. *G06F 11/0727* (2013.01)

(58) Field of Classification Search
CPC ........................ G11B 20/1883; G11B 20/1886
See application file for complete search history.

(56) References Cited

U.S. PATENT DOCUMENTS

| | | | | |
|---|---|---|---|---|
| 4,746,995 | A * | 5/1988 | Rauskolb | 360/31 |
| 6,177,805 | B1 * | 1/2001 | Pih | 324/754.03 |
| 6,301,167 | B1 * | 10/2001 | Lee et al. | 365/201 |
| 6,762,615 | B2 * | 7/2004 | Lee et al. | 324/756.05 |
| 6,771,088 | B2 * | 8/2004 | Kim et al. | 324/750.14 |
| 6,781,398 | B2 * | 8/2004 | Adler et al. | 324/762.02 |
| 7,374,293 | B2 * | 5/2008 | Li et al. | 324/754.07 |
| 7,913,119 | B2 * | 3/2011 | Hama | 714/29 |
| 8,335,909 | B2 * | 12/2012 | Ballew et al. | 712/10 |
| 8,549,912 | B2 * | 10/2013 | Merrow et al. | 73/431 |
| 2002/0056057 | A1 * | 5/2002 | Co | 714/42 |
| 2004/0078698 | A1 * | 4/2004 | Co et al. | 714/42 |
| 2005/0021275 | A1 * | 1/2005 | Lawrence et al. | 702/122 |
| 2005/0028062 | A1 * | 2/2005 | Herrmann et al. | 714/736 |
| 2005/0105350 | A1 * | 5/2005 | Zimmerman | 365/201 |
| 2006/0046562 | A1 * | 3/2006 | Ou Yang et al. | 439/541.5 |
| 2006/0242468 | A1 * | 10/2006 | Kang | 714/42 |
| 2009/0322346 | A1 * | 12/2009 | Cao | 324/555 |
| 2014/0005972 | A1 * | 1/2014 | Gamble et al. | 702/122 |

OTHER PUBLICATIONS

"Preboot Execution Environment (PXE) Specification, Version 2.1," Intel Corporation, Sep. 20, 1999, 103 pp.

* cited by examiner

*Primary Examiner* — Amine Riad
(74) *Attorney, Agent, or Firm* — Dawn-Marie Bey; Bey & Cotropia PLLC

(57) ABSTRACT

Systems and methods for automating testing of multiple SATA hard drives with multiple motherboards are described herein. In certain embodiments any number of SATA drives may be switchably connected to any number of motherboards, and any number of tests may be performed on combinations of the SATA drives and motherboards without or with only minimal manual intervention between tests. In one embodiment, the system may include an automated selector having a controller adapted to receive a testing instruction and transmit the received testing instruction and a mainboard in communication with the controller. The mainboard may include a logic device to receive the testing instruction from the controller and/or a switch for pairing and unpairing motherboards with SATA storage devices.

20 Claims, 7 Drawing Sheets

SYSTEM AND METHOD FOR AUTOMATED HARDWARE COMPATIBILITY TESTING

GOVERNMENT RIGHTS STATEMENT

Certain embodiments herein were made with government support under a contract awarded by the National Security Agency (NSA). The government has certain rights in those embodiments.

FIELD OF THE EMBODIMENTS

The embodiments described herein relate to the field of computer equipment testing. More specifically the inventive systems and methods relate to robust and automated testing of multiple SATA hard drives with multiple computing components such as motherboards.

BACKGROUND

Serial ATA (SATA) hard drives are commonly used to store data in personal and industrial computing environments. The compatibility of a SATA drive with a particular computing environment may depend on a number of variables, including firmware, software and hardware configuration. SATA hard drives implement a standard which can be validly interpreted in multiple ways, and these interpretations vary across vendors and even across drive models from the same vendor. Software or hardware that interfaces with these drives may fail or perform inefficiently because of these implementation differences. Testing of SATA drives against software and/or hardware is therefore necessary to ensure customer satisfaction and to provide product support staff with performance and compatibility data.

As shown in FIG. 1, currently known testing relies on manual setup and repeated reconfiguration of the testing environment. A number of SATA drives must be manually connected to a first test motherboard 101, and a number of compatibility tests may be run 102. When all tests for that hardware configuration have run to completion, an engineer manually disconnects the drive(s) from the motherboard 103. Only then can the engineer manually connect the drive(s) to a second motherboard 104 to run additional tests 105. This process may be repeated until all SATA drives are tested with all motherboards.

This process typically results in two major inefficiencies. First, the manual reconfiguration (steps 103, 104) required between each round of tests is slow and tedious. Second, the practice of waiting for all tests to run to completion 102 prior to reconfiguring the environment (103, 104) may cause excessive delays when a test operator is not available at completion of the test to reconfigure the environment. Moreover, hard drives and test cables may be damaged during insertion, removal and handling, which can cause inconclusive and/or invalid test results.

Hardware switches exist for other types of hardware (e.g., KVM switches and serial port switches). For example, one or more USB and/or eSATA hard drives may be connected to a switch. However, this setup only connects a single hard drive at a time and is not software controlled for selective testing.

Currently, there are no hardware and/or software solutions available to truly automate the testing of multiple SATA drives with multiple motherboard configurations. It would therefore be beneficial if a robust and automated method and system were available to test a plurality of SATA hard drives varying in model and/or vendor with a plurality of motherboards. Because development teams are small and are adopting continuous integration testing as part of an "Agile" development process, it would be beneficial if such a system could enable more efficient testing (i.e., testing in parallel) without impacting test fidelity.

SUMMARY OF THE EMBODIMENTS

In accordance with the present embodiment, systems and methods for automating testing of multiple SATA hard drives with multiple motherboards are described herein. In certain embodiments any number of SATA drives may be switchably connected to any number of motherboards, and any number of tests may be performed on combinations of the SATA drives and motherboards without or with only minimal manual intervention between tests.

In a first aspect of the embodiment a system for automatically testing multiple SATA storage devices with multiple motherboards is provided. In one embodiment, the system may include an automated selector having a controller adapted to receive a testing instruction and transmit the received testing instruction and a mainboard in communication with the controller. The mainboard may include a logic device to receive the testing instruction from the controller and/or a switch for pairing and unpairing motherboards with SATA storage devices. Upon receiving a testing instruction, the automated selector may be adapted to: automatically pair a first storage device with a first motherboard ("first pair"); automatically pair a second storage device with a second motherboard ("second pair"); simultaneously test the first pair and second pair, based on the testing instruction; automatically unpair the first storage device from the first motherboard; automatically unpair the second storage device from the second motherboard; automatically pair the second storage device with the first motherboard ("third pair"); automatically pair the first storage device with the second motherboard ("fourth pair"); simultaneously test the third pair and fourth pair, based on the testing instruction; and/or provide test results data relating to one or more of the testing of the first pair, second pair, third pair, or fourth pair.

In another aspect of the embodiment, a computer-implemented method of testing computing equipment is provided. The method may include: connecting a first SATA hard drive, a second SATA hard drive, a first motherboard, and a second motherboard to an automated selector; automatically pairing, by the automated selector, the first SATA hard drive to the first motherboard and executing first configuration testing; and/or automatically pairing, by the automated selector, the second SATA hard drive to the second motherboard and executing second configuration testing. Upon completion of the first configuration testing and the second configuration testing, the method may also include automatically unpairing, by the automated selector, the first SATA hard drive from the first motherboard; and/or automatically unpairing, by the automated selector, the second SATA hard drive from the second motherboard. The method may further include automatically pairing, by the automated selector, the second SATA hard drive to the first motherboard and executing third configuration testing; automatically pairing, by the automated selector, the first SATA hard drive to the second motherboard and executing fourth configuration testing; and/or reporting, by the automated selector, testing results data of one or more of the first configuration testing, second configuration testing, third configuration testing and/or fourth configuration testing.

These and other aspects of the embodiments may be more clearly understood by reference to the following detailed description of the embodiments and the appended claims.

BRIEF DESCRIPTION OF THE DRAWINGS

The preferred embodiments are illustrated by way of example and not limited to the following figures.

DETAILED DESCRIPTION

Various embodiments will be described with reference to details discussed below and the accompanying drawings. The following description and drawings are illustrative of the embodiments and are not to be construed as limiting. Numerous specific details are described to provide a thorough understanding of various embodiments. However, in certain instances, well-known or conventional details are not described in order to provide a concise discussion of the embodiments.

Exemplary testing automation firmware, software and/or hardware described herein allows for multiple tests to be run on combinations of SATA drives and motherboards, without the need to manually disconnect and reconnect equipment between tests. Instead of requiring a test engineer to physically connect and disconnect hard drives, the described testing methods and systems allow motherboards and hard drives to be paired and unpaired, automatically, through software control.

Inventive techniques described herein can schedule any number of tests of storage equipment and computing equipment to minimize total test time, rather than requiring that each test round only start when all tests in the previous round have completed. This allows for greater efficiency in equipment testing and further minimizes damage to fragile hard drives and connecting cables. This is because equipment handling is reduced, and engineers are less likely to damage a drive by dropping it, jarring it, or merely by introducing static electricity during insertion/removal.

Figure 2:
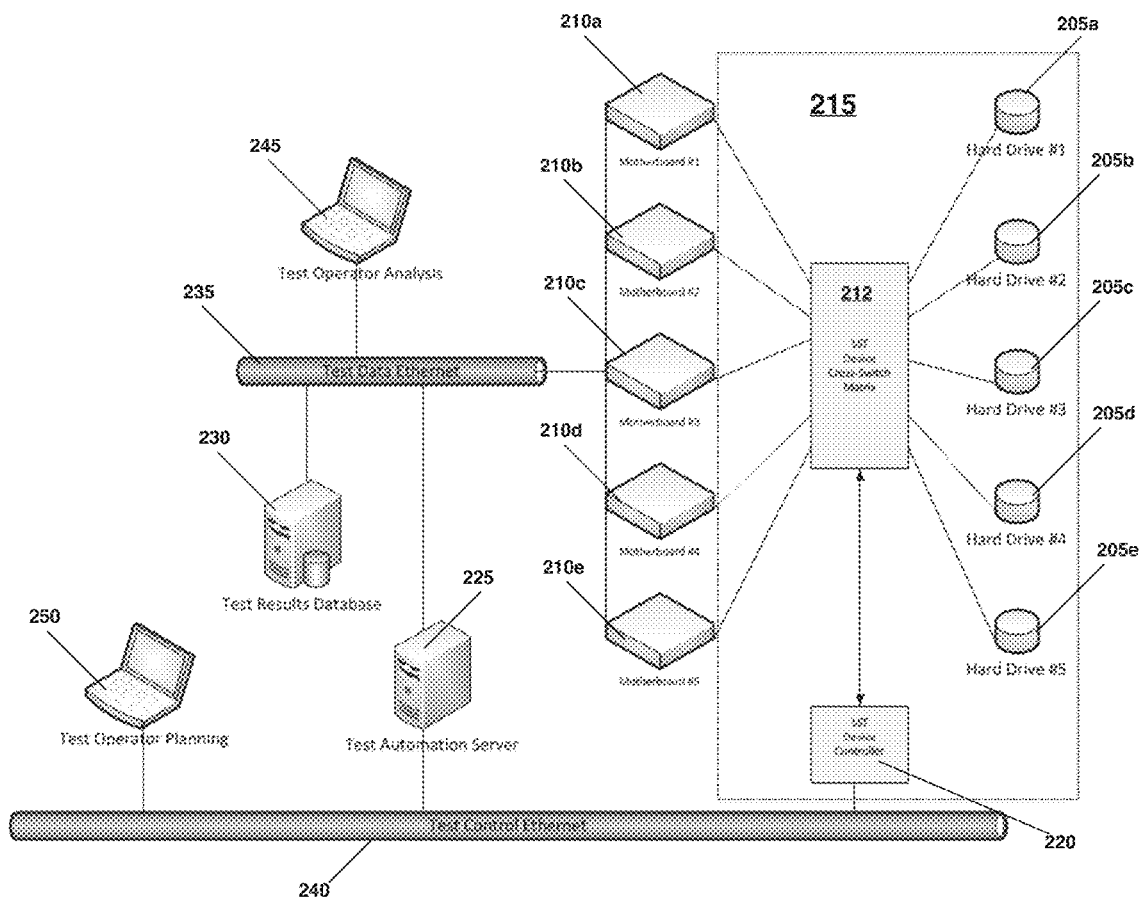
FIG. 2 shows a testing system architecture according to an exemplary embodiment.

Referring to FIG. 2, an exemplary testing system is illustrated. As shown, a testing environment may comprise a test automation server 225 and test results database 230 in communication with a network, such as a test data Ethernet network 235. An automated selector 215 is shown in communication with the test data Ethernet network 235, a plurality of SATA hard drives 205a-e and a plurality of motherboards 210a-e. The automated selector 215 is shown to comprise a device cross-switch matrix 212 and device controller 220 in communication with a. The automated selector unit 215 is also shown to be in communication with the test control Ethernet network 240. Although the automated selector is shown to comprise motherboards 210 and hard drives 205, it will be appreciated that such components may be connected to an automated selector 215 via a wired or wireless connection and need not necessarily be housed within an enclosure of the automated selector.

Generally, each component of an exemplary testing system may be in communication with the other units via a physical connection (e.g., USB, SATA, or Ethernet cables) and/or via a wireless connection (e.g., a LAN, WAN, the Internet, or other wireless networks), and all units may communicate using a standard protocol, such as but not limited to XML-RPC.

As shown, the system may comprise a test automation server 225, which may comprise at least a processor and memory. The processor my be adapted to execute one or more software programs stored in memory to execute a number of tests on a SATA drive 205/motherboard 210 combination. Generally, the test automation server 225 provides test scripts (not shown) to a software agent executing on a motherboard 210 and/or to the automated selector 215 device.

In one embodiment, a test automation sever 225 may be in communication with a plurality of SATA drives 205 and/or motherboards 210 via a network such as but not limited to a test data Ethernet network 235 and/or a test control Ethernet network 240. For example, the test automation server 225 may be controlled via the test control Ethernet network 240, but may send and receive testing scripts and/or testing data via the test data Ethernet network 235. In other embodiments, the testing automation server 235 may be physically connected to the SATA drives 205 and/or motherboards 210.

One or more test scripts may be loaded onto memory of the testing server 225, and the scripts may be executed to test various configurations of software and/or memory. For example, a planning test operator 250 may access the test automation server 225 via the test control Ethernet network 235 to run a testing script. The testing script may reside on a test results database 230, or may be stored locally on the test automation server 225. The script may execute any number of tests for each combination of a motherboard and any number of SATA drives. The drives may then be unpaired from the first motherboard and paired with a second motherboard, and the tests may be repeated.

In certain embodiments, the test automation server 225 may be in communication with a test results database 230 (i.e., central file store) via a wired or wireless connection (e.g., via the test data Ethernet network 235). The test results database 230 may be capable of storing testing scripts and/or any output data from testing in a persisting and machine-readable fashion. The test results database 230 may comprise any number of removable or non-removable media, such as but not limited to: tape libraries, RAID systems, hard disk drives (e.g., SATA), magnetic tape drives, optical disc drives, magneto-optical disc drives, and/or holographic memory. Data on such storage devices is typically organized in a file system (e.g., NTFS or HFS), however relational databases (ORACLE or MYSQL) may be employed without an intermediate file system or storage manager. The contents of such devices may be memory mapped for rapid traversal, and may be accessed via TFTP, FTP and/or NFS access.

As shown, an exemplary testing system may comprise an automated selector unit 215 adapted to pair SATA hard drives 205a-e to motherboards 210a-e. The automated selector 215 may be placed in physical or wireless communication with other components of the system via a wired or wireless connection (e.g., the test date Ethernet 235 and/or test control Ethernet 240. An automated selector 215 may comprise or otherwise be placed in communication with a device controller 220, which may receive testing instructions and cause the automated selector to execute those instructions.

Generally, tests may exercise a hard drive controller interface (on a motherboard 210) to the hard drive hardware/firmware (on the hard drive 205) to ensure the software under test correctly configures and can access the hard drive, and/or to characterize the performance of the configuration. An exemplary simple test may perform a full disk format of the hard drive and then attempt to mount the new volume in the operating system. An exemplary complex test may create a recovery image of the hard drive and then restore this image, testing read/write access to the hard drive as evidence that the restore operation was successful.

Upon completion of a test, results may be stored in, for example, the test results database 230 where they may be analyzed by a test operator 245. The operator 245 may access the test results database via a wired or wireless (e.g., test data Ethernet network 235) connection. As described in detail below, one or more user interfaces may be provided to review the test results and/or status of the system.

Figure 3A:
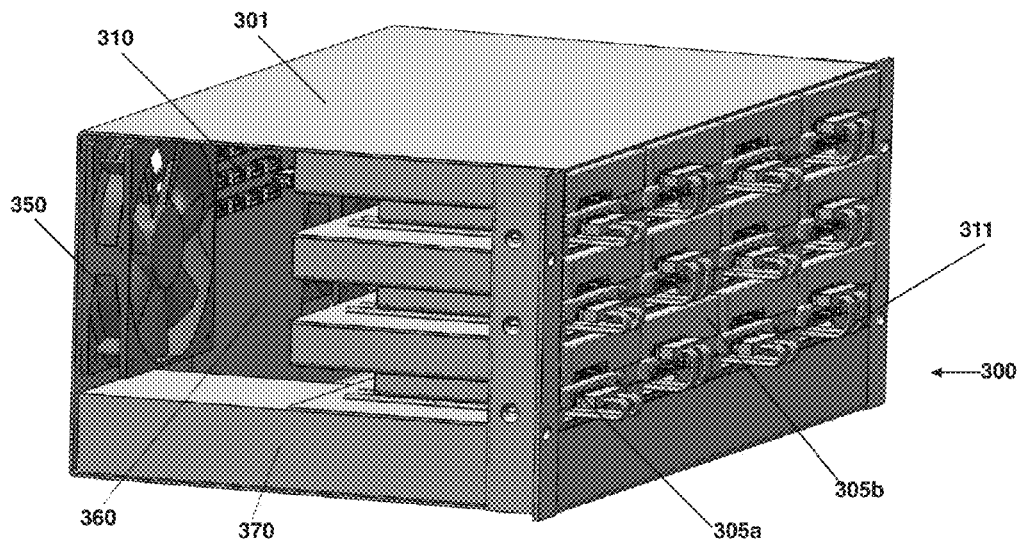
FIG. 3A shows a side view of an exemplary automated selector unit 300 with a side panel removed.

Referring to FIG. 3A, a side view of an exemplary automated selector unit 300 is illustrated with a side panel removed to show internal components. As shown, the automated selector unit 300 comprises an enclosure 301 supporting rack mounting, and adapted to hold a number of SATA hard drives 305. In the pictured embodiment, up to 12 hard drives may be inserted, and each hard drive may be a 3.5 inch drive (305b) or 2.5 inch drive (305a). In various embodiments, any number of hard drives may be accommodated (e.g., up to 20 hard drives). Once in position, a SATA test cable 360 may be inserted into a female port in the hard drive 305, and the other end of the cable may be inserted into a female port 310 of an automated selector mainboard 360.

The mainboard 360 may provide front panel indicators 307 for each test motherboard port and SATA drive dock. In one embodiment, indicators may comprise lights that are activated to indicate one or more of the following: whether a motherboard is connected; whether a SATA drive is connected to a dock; whether it is safe to remove hardware from the port or dock; whether a port or dock is disabled (and therefore in a safe state for removal); and/or whether a dock has power. The mainboard 360 may be fabricated using field-programmable gate array (FPGA) technology, for example.

In certain embodiments, the enclosure may be fan 350 or liquid cooled. For example, two fans 350 may be employed to provide a combined 100 CFM for 151 W total power dissipation. The fans may be located at the rear of the enclosure 301 for cooling of both drives and circuit boards. The automated selector unit 300 may also comprise a sufficient power supply 370, which may receive power from a standard 120V power cord.

Figure 3B:
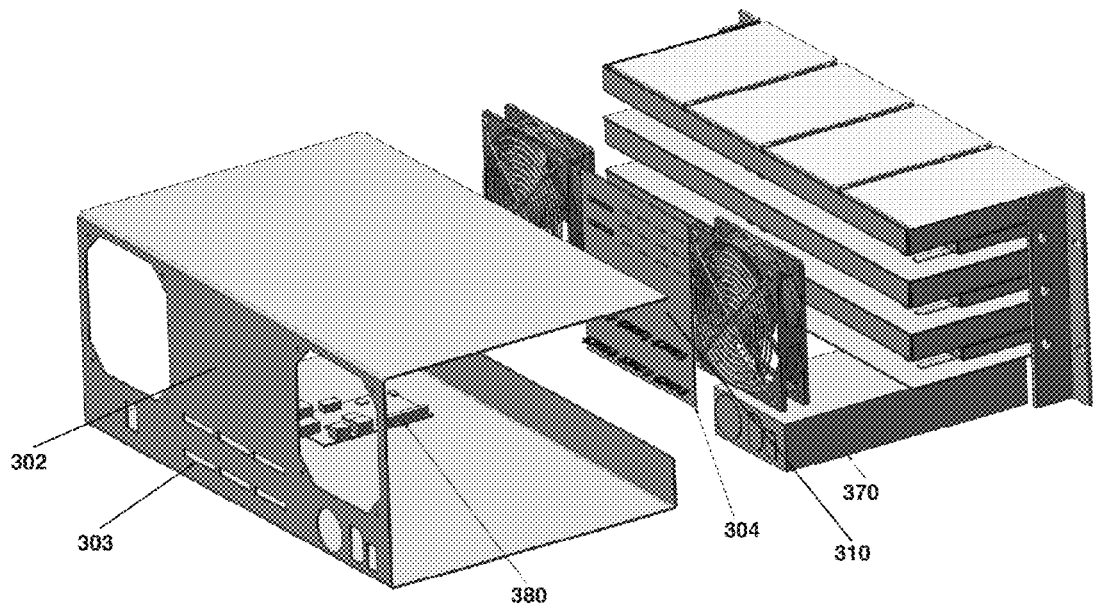
FIG. 3B shows an exploded view of an exemplary automated selector unit 300.

Referring to FIG. 3B, an exploded view of an exemplary automated selector unit 300 is illustrated. As shown, a rear panel 302 comprises a number of apertures 303 to allow SATA female ports 304 located on the automated selector mainboard 360 to be accessed. In this way, a cable may connect a motherboard (not shown) to the automated selector mainboard 360.

As shown, the automated selector 300 comprises a control board or controller 380. The automated selector may provide a user-controlled one-to-one mapping between two-sets of ports, and mapping may be controlled by user commands sent over an Ethernet interface and processed by a control system. The controller 380 may provide a network (e.g., Ethernet) interface and front panel controls. Local control may be accomplished through a serial console (not shown), while remote control may be through a network using a remote procedure call protocol, such as XML-RPC. The protocol may employ HTTP as a transport mechanism to provide user interfaces, such as but not limited to, a user interface for updating automated selector mainboard firmware.

In one embodiment, an exemplary controller board may comprise a single circuit board computer—a computer built on a single circuit board with microprocessor(s), memory, input/output, etc. For example, a blade server, ARDUINO™ or RASPBERRY PI™ single board computer may be employed. An exemplary single circuit board computer may comprise: a BROADCOM BCM2835 ARM11 700 MHZ processor; Ethernet port; SD Card slot; DSI Display connector; GPIO headers; JTA headers; RCA video out; audio out; status leads; USB 2.0; and a CSI connector camera. In alternative embodiments, multi-board computers may be employed.

Figure 3C:
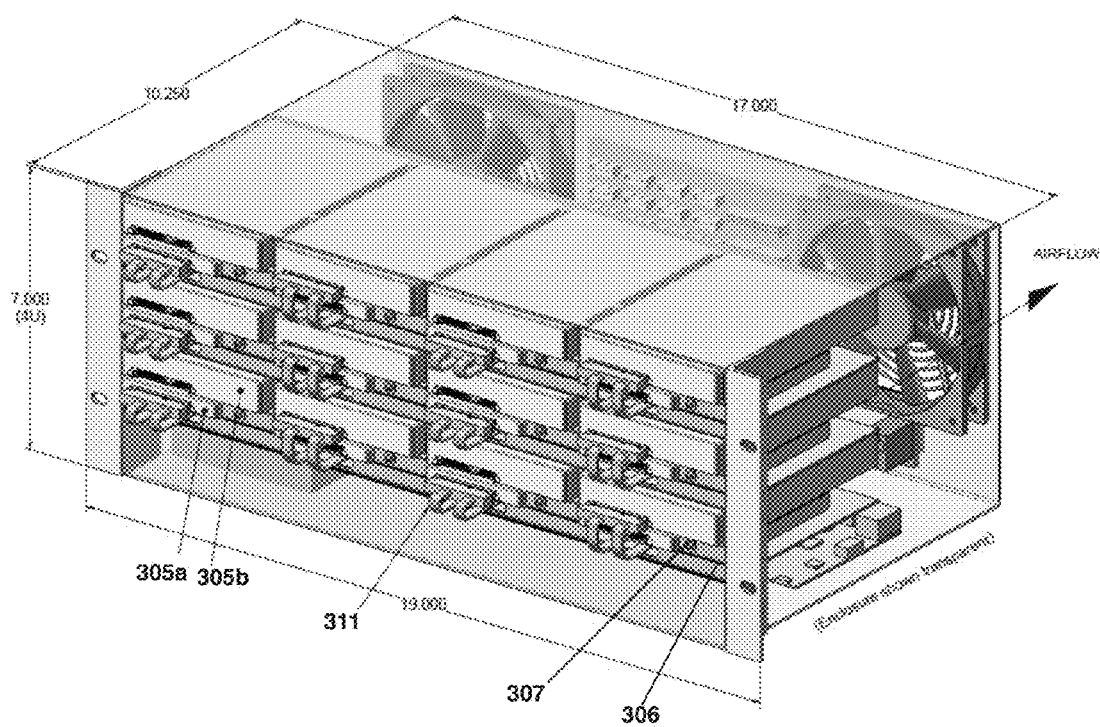
FIG. 3C shows a front perspective view of an exemplary automated selector unit 300, with transparent enclosure.

Referring to FIG. 3C a front perspective view of an exemplary automated selector 300 is illustrated with transparent enclosure 301. As shown, the unit may comprise any number of SATA drive docks 306, and such docks may be located be at the front of the unit. Each dock may comprise a male SATA connector and power connector, and the docks may be adapted to receive 2.5" or 3.5" SATA disk drives 305 of 3 gbps or 6 gbps speed. Indicator lights 307 for each dock may also be located on the front of the unit.

Although not shown, an exemplary testing system may comprise a standard computer rack with a plurality of motherboard ports, a power supply, a network switch, and one or more automated selectors. This configuration may require some addition additional space in the equipment rack for the automated selector unit, additional power, and a port on an Ethernet switch. It will be appreciated that, each of the components of the testing system may be located in a single rack mount, in multiple mounts, or may even be located in different geographical locations, so long as the components are connected via a wired or wireless connection.

An exemplary network switch may comprise a multi-port network bridge that processes and routes data at one or more layers of the OSI model (e.g., layer 2 or 3). The switch employed depends on the network desired or required, and exemplary networks include Ethernet, Fiber Channel, Asynchronous Transfer Mode, Infiniband and others. In a preferred embodiment, a multi-port Ethernet switch may be employed.

In an exemplary embodiment, each motherboard port may be adapted to receive a motherboard, and any number of ports may be present. For example, a testing rack may comprise from 1 motherboard port to about 20 motherboard ports (e.g., 5, 10, 12, 15, or 20). The motherboard ports may be located, for example, at the rear of the unit, with indicator lights corresponding to the status of each port located on the front of the unit. Each motherboard port may comprise a female SATA connector.

An exemplary unit may comprise any number of motherboards seated in the motherboard ports, wherein each motherboard is connected to other components of the system via the network switch or via an automated selector mainboard 360. Each motherboard may comprise a number of electronic components of a computer system, including but not limited to one or more of: a CPU, memory, and connectors for peripherals. Motherboards may comprise any number of sub-systems such as processors and may comprise any number of expansion capabilities. Components such as sound cards, video card, network cards, hard drives, USB and/or FireWire slots may be present along with any number of other custom components. Motherboards typically include sockets in which one or more microprocessors may be installed; logic and connectors to support commonly used input devices (e.g., PS/2 connector for a mouse and keyboard); slots into which main memory (e.g., DIMM) may be installed; a chipset which forms an interface between the CPU's front-side-bus, main memory and peripheral buses; non-volatile memory chips (e.g., Flash Rom) containing firmware and/or BIOS; a clock generator producing a system clock signal to synchronize various components; slots for expansion cards; power connectors, which receive electrical power from a computer power supply and distribute the same to other components; and heat sinks and mounting points for pans to dissipate excess heat.

In one embodiment, the system may comprise a Preboot eXecution Environment or Pre-Execution Environment (PXE). A PXE is a vendor-independent environment to boot computers using a network interface independent of data storage devices or installed operating systems. An exemplary PXE is described in version 2.1 of the Wired for Management framework by INTEL published by INTEL and SYSTEM-SOFT on Sep. 20, 1999, incorporated herein by reference in its entirety.

PXE allows networked computers that are not yet loaded with an operating system to be configured and booted remotely by a user (e.g., an administrator). PXE code may be loaded onto each client computer to allow the client to communicate with the network server. The client may be remotely configured and its operating system can be remotely booted.

The PXE provides a Dynamic Host Configuration Protocol (DHCP), which allows the client to receive an IP address to gain access to the network servers. The PXE also provides an API used by the client's BIOS or a NBP that automates booting of the OS and other configuration steps. Finally, the PXE provides a standard method of initializing the PXE code in the PXE ROM or boot disk.

An exemplary PXE process may comprise:
(1) A client notifies a server that it uses PXE;
(2) The server sends the client a list of boot servers that contain an available OS;
(3) The client finds the boot server and receives the OS file from the server;
(4) The client downloads the file using Trivial File Transfer Protocol (TFTP) and executes the OS file to load the OS.

Table 1 below explains some additional features of the automated selector.

Figure 4:
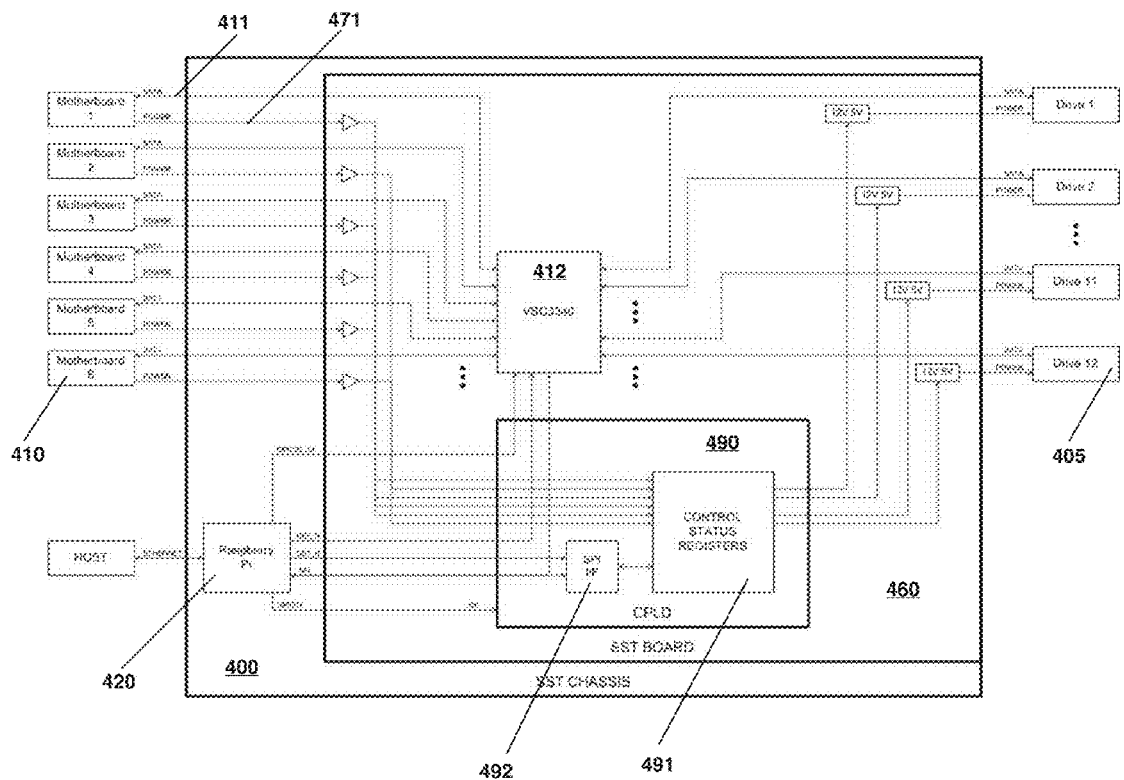
FIG. 4 shows a circuit diagram of an exemplary testing environment comprising an automated selector 400.

Referring to FIG. 4, a circuit diagram of an exemplary testing environment comprising an automated selector 400 is illustrated. As shown, the testing environment comprises a number of motherboards 410 and SATA drives 405 connected to a mainboard 460 of an automated selector 400 via a number of SATA connectors 411 and power connectors 471.

The mainboard 460 may provide a switching means to map motherboard ports to SATA drive docks or to isolate drives altogether when not required during testing. Specifically, each motherboard 410 and SATA drive 405 may be connected to a device cross switching matrix 412 via a SATA cable 411.

The device cross switching matrix 412 may comprise a crossbar switch adapted to connect multiple inputs to multiple outputs in a matrix manner. An exemplary crossbar switch may comprise an assembly of individual switches between multiple inputs and multiple outputs. The switches may be arranged in a matrix. For example, if the crossbar switch has M inputs and N outputs, then a crossbar has a matrix with M×N cross-points or places where the "bars" cross. At each crosspoint may be a switch; when closed, it connects one of M inputs to one of N outputs. A given crossbar may comprise a single layer, non-blocking switch. In other words, other concurrent connections do not prevent connecting an arbitrary input to any arbitrary output. Collections of crossbars can be used to implement multiple layer and/or blocking switches.

In a preferred embodiment, the device cross switching matrix 412 may comprise a high speed cross-point integrated circuit. Exemplary device cross switching matrixes 412 include those produced by VITESSE™ (e.g., VSC3340) or MINDSPEED™ ranging from 4×4 to 144×144 or to 160× 160. For reference, a 40×40 crosspoint switch may support 20 SATA hard drives and 20 motherboards.

In an alternative embodiment, any number of discrete RF switches (2 RF inputs×2RF outputs) configured in a Bayesian-like network may be employed. In such an embodiment, to compensate for any signal loss, RF amplifiers may be incorporated into the system.

In one embodiment, the mainboard 460 may comprise logic adapted to control switching (i.e., pairing, unpairing, connecting and/or disconnecting) of SATA drives to motherboards, such as but not limited to a complex programmable

TABLE 1

| | |
|---|---|
| Power-on | The first time the automated selector device is powered-on it may not have any network connectivity, nor any board/drive mappings. However, once the device has been network configured for the first time it may continually maintain that configuration going forward. |
| Power-off | Removing power may remove all previous board/drive mappings. If the device was given an IP address it may maintain that address and respond accordingly during the next power cycle. |
| Reset | The system may not include a factory default reset. Once configured, the system may always maintain a minimal configuration. This generally includes network settings and embedded software. However, sending a "reset" command or removing power may have the affect of removing all previous board/drive mappings. |
| Critical temperature | Critical temperature is a threshold in which the device has reached an operating temperature that is not acceptable for normal operation. As such, there may be an indicator on the front panel that when "on" indicates the system has reached thermal shutdown and will enter a mode otherwise known as "reset mode". During reset mode the system may not allow board/drive mappings to occur and may return a Failure Status (−1) when initiating a map command. |
| Web status | System status may be enhanced by the addition of a Web Status page. The status page may provides near-real time statistics such as board power, mapping status, current temperature, current IP, and both temperature and fan alerts. The Web Status may be updated approximately every 6 seconds. | logic device (CPLD) 490. An exemplary CPLD may comprise control status registers 491 used as storage devices for information about instructions received from a controller 420. Switch control 491 may send instructions to the switch 412 to pair any one of several motherboard hard drive controllers with any one of several attached SATA hard drives. In one embodiment, each drive may only be paired with a single controller at one time, and controllers and drives may be paired without disrupting other existing pairs. For example, the system may prevent disconnecting an established drive/motherboard pair until it is safe to do so.

In certain embodiments, the system may employ Serial Peripheral Interface bus (SPI) & general-purpose input/output (GPIO). SPI bus is a synchronous serial data link de facto standard that operates in full duplex mode, allowing devices to communicate in master/slave mode where the master device initiates the data frame. General-purpose input/output (GPIO) is a programmable generic pin on an IC that may be controlled by a user at run time. GPIO pins have no special purpose defined and go unused by default. The controller 420 may employ a standard SPI and GPIO for control and/or status display between the controller, the cross-point integrated circuit 412, and the CPLD 491 (at 492).

Figure 1:
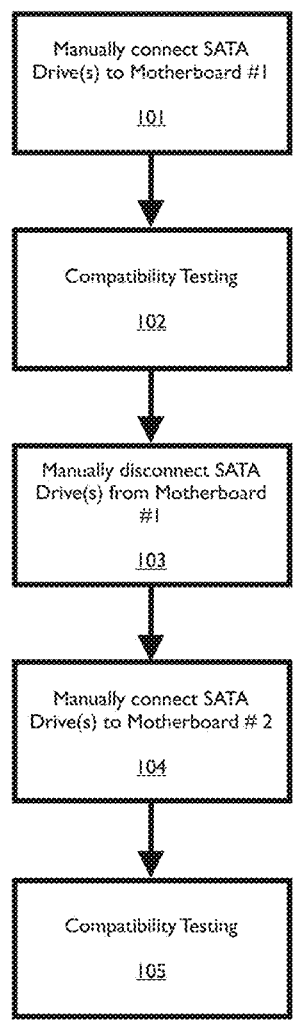
FIG. 1 shows a prior art method of testing multiple hard drives with multiple motherboards.

In one embodiment, control of an automated selector may be achieved through a local network (e.g., FIG. 1 at test control Ethernet network 240). The automated selector 400 may be locally configured and self-tested using a USB or separate secondary network (e.g., Ethernet) interface. Control board 420 software may provide a menu or other control means to execute commands (e.g., self test, map ports to docks, etc.) and/or to view results (e.g., current status and logs). For example, the user may determine the system configuration or may reset the system via the USB or secondary network, and/or may also:

determine whether a system component is powered
    determine the status of a motherboard (i.e., connected to a hard drive)
    determine the mapping of a motherboard and/or hard drive
    determine/update firmware version
    determine/manipulate active connections to the system
    connect/disconnect a motherboard to a hard drive
    connect/disconnect all motherboards to hard drives
    connect/disconnect all hard drives to motherboards Control of the unit may primarily be accomplished employing XML-RPC from the designated test automation server. XML-RPC is a remote procedure call (RPC) protocol which uses XML to encode its calls and HTTP as a transport mechanism. The unit may be configured to recognize one or more test automation servers and to only accept XML-RPC from those servers. In one embodiment, only a single test server may be configured, as limiting XML-RPC to one server provides assurance that tests will not be disrupted by accidental XML-RPC commands.

In certain embodiments, it may be important to testing integrity that changes are only permitted in a controlled manner. Accordingly, a test operator may be allowed to manually insert and/or remove drives, and connect motherboards to ports only if the unit is off. However, when the unit is on, all such changes may be limited to execution via the test server (i.e., firmware does not allow hot swapping of drives).

It will be appreciated that, to permit trouble shooting, some changes may be allowed when the unit is on and no network is active (i.e., the network cable is unplugged). These limited changes may include: setting a static IPv4 address or DHCP; updating the unit firmware; and/or mapping SATA drives to ports.

Hardware interfacing may provide a main link from XML-RPC to hardware by interpreting XML-RPC and performing hardware translation. This provides for the ability to read & write directly to hardware, and further may allow control of both the CPLD 491 and cross-point switch 412.

Exemplary switching software may send directions to, for example:

(1) Run a number of tests for a first SATA drive, first motherboard pair;
(2) Upon completion of the tests, unpair or disconnect the first SATA drive from the first motherboard;
(3) Connect or pair a second SATA drive to the first motherboard;
(4) Run a number of tests for the second SATA drive to the first motherboard;
(5) Upon completion of the tests, unpair or disconnect the second SATA drive from the first motherboard;
(6) Repeat steps (3)-(5) for all connected SATA drives;
(7) Upon completion of all test with all SATA drives, connect or pair the first SATA drive to a second motherboard; and
(8) Repeat all steps so that each SATA drive is tested with each motherboard.

It will be appreciated that the control switching logic may allow for a number of hard drive/motherboard pairs to be tested simultaneously. For example, a first hard drive and first motherboard may be tested while a second hard drive and second motherboard are simultaneously tested. When multiple motherboards and hard drives are present, the switching logic may be configured to minimize total testing time.

Figure 5:
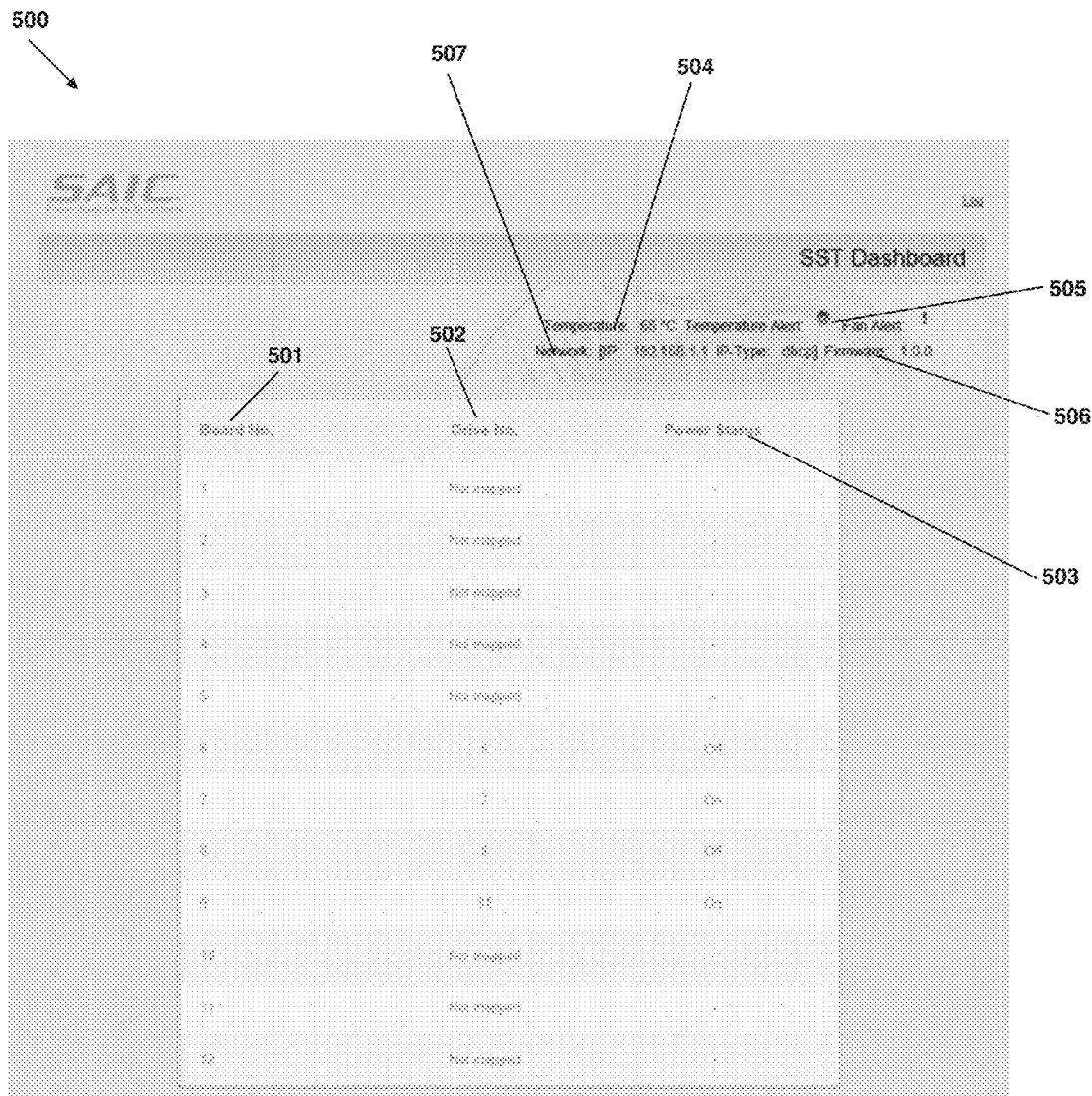
FIG. 5 shows an exemplary status user interface 500 displaying a status of SATA drives and motherboards to a user via a user interface, such as but not limited to a web page interface.

Referring to FIG. 5, an exemplary status user interface 500 is illustrated. In one embodiment, a control board may display the status of components of a testing system to a user via a user interface, such as but not limited to a web page interface. As shown, the UI may display: motherboards present in the system 501, hard drives present in the system, hard drive/motherboard mapping 502, power status for each hard drive/motherboard pair 503, current temperature 504, system alerts 505 (e.g., temperature alert and/or fan alert), firmware version 506, and/or network address 507. In certain embodiments, displayed status may include such variables as an overall unit health measurement, a current and/or historic mapping of SATA drives to ports, and a status of a testing server controlling the unit.

In the pictured embodiment, the status user interface is for reporting only, and does not allow control of the device. In certain embodiments, a user may interact with the system via a UI provided by a built-in web server. The UI may be accessible using any web enabled application or browser. The UI may be read-only, or may allow for the ability to configure the system.

Figure 6:
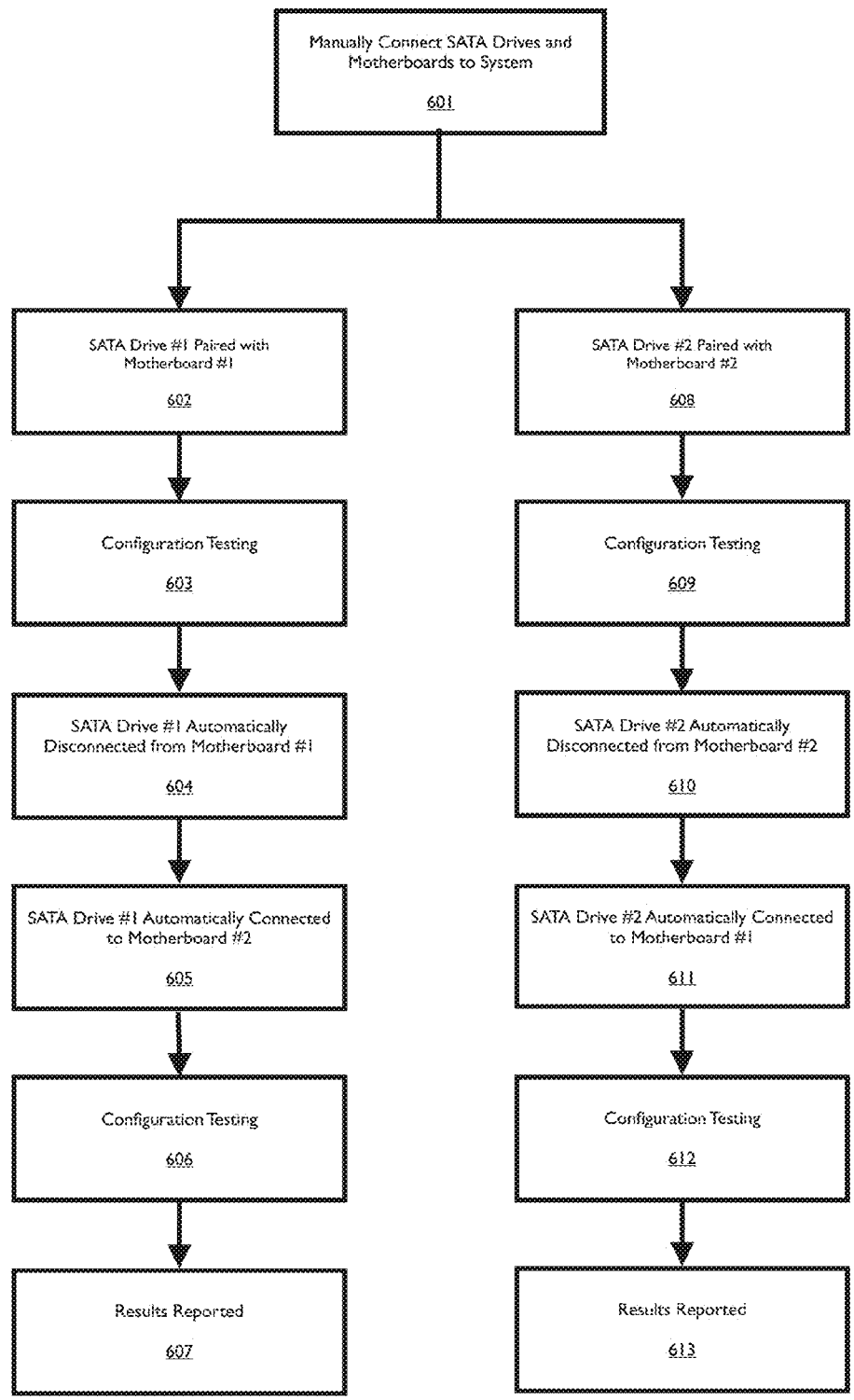
FIG. 6 shows an exemplary method for automated testing of multiple SATA hard drives and motherboards.

Referring to FIG. 6, an exemplary method for automated testing of multiple SATA hard drives and motherboards is illustrated. As shown, a hardware configuration may be prepared by connecting a number of SATA drives (e.g., drive #1 and drive #2) and motherboards (e.g., motherboard #1 and motherboard #2) to an automated testing system 601.

A hardware test configuration may comprise multiple tests, so a number of scripts may be loaded onto memory of a test automation server. When the hardware configuration is prepared, scripts on the test automation server may initiate and control the testing, for example by using XML-RPC.

First, software executing on the test automation server connects a first SATA hard drive (drive #1) to a first motherboard (motherboard #1) 602 and a second SATA hard drive (drive #2) to a second motherboard (motherboard #2) 608 and configuration testing begins 603, 609.

In one embodiment configuration testing comprises:

(1) The motherboard PXE boots, and the motherboard loads a specific operating system and patch level onto one of a number of hard drives connected to the motherboard;

(2) The motherboard boots from the hard drive;

(3) The motherboard executes one of a number of tests;

(4) The motherboard repeats steps (1)-(3) for each test until all tests for the hardware configuration are complete.

Although any type of test may be run to test a SATA hard drive and motherboard pair, a number of exemplary tests include, but are not limited to: a full drive format of the hard drive; installing and booting from an operating system on the hard drive; creating and restoring an image of the hard drive; or measuring the speed of reading and writing to and from the hard drive.

While testing is being run on the drive #1/motherboard #1 pair, similar testing may be run on a drive #2/motherboard #2 pair 609.

Once configuration testing is completed, the first hard drive (drive #1) is automatically disconnected from the first motherboard (motherboard #1) 604 and the second hard drive (drive #2) is disconnected from the second motherboard (motherboard #2) 610.

Hard drive #1 may then be automatically paired with motherboard #2 605 and hard drive #2 may be paired with motherboard #1 611. And then testing is again carried out to completion 606, 612. The above steps (1)-(4) may be repeated for each motherboard/hard drive pair until all hard drives and motherboards have been tested. Importantly, testing of motherboard and hard drive pairs may be conducted simultaneously for any number of hard drive and motherboard pairs (i.e., motherboard #1/drive #1 may be tested at the same time as motherboard #2/drive #2).

Upon completion of testing, an indication and/or report may be presented to a test operator 607, 613. At this point, if desired or required, the test operator may prepare a next hardware test configuration and may initiate a test automation server script for the new hardware configuration.

New test automation server scripts may configure a specific combination of motherboards and SATA hard drives, then initiate testing for the hardware configuration as before. As testing completes, new test automation scripts may prepare the next hardware test configuration and continue testing. The test operator need not be involved until all tests for the full combination of motherboards and SATA hard drives is complete. The test operator may, however, still be required to swap out the motherboards and SATA hard drives if devices under test experience hardware failures or if additional devices must be tested.

Unless specifically stated otherwise, as apparent from the previous discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a flash memory device, such as a compact flash card or USB flash drive.

Some exemplary embodiments described herein are described as software executed on at least one computer, though it is understood that embodiments can be configured in other ways and retain functionality. The embodiments can be implemented on known devices such as a server, a personal computer, a special purpose computer, a programmed microprocessor or microcontroller and peripheral integrated circuit element(s), and ASIC or other integrated circuit, a digital signal processor, a hard-wired electronic or logic circuit such as a discrete element circuit, or the like. In general, any device capable of implementing the processes described herein can be used to implement the systems and techniques according to this embodiments.

It is to be appreciated that the various components of the technology can be located at distant portions of a distributed network and/or the internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The terms determine, calculate and compute, and variations thereof, as used herein are used interchangeably and include any type of methodology, process, mathematical operation or technique.

The embodiments described and claimed herein are not to be limited in scope by the specific examples herein disclosed since these examples are intended as illustrations of several aspects of the embodiments. Any equivalent examples are intended to be within the scope of this embodiments. Indeed, various modifications of the embodiments in addition to those shown and described herein will become apparent to those skilled in the art from the foregoing description. Such modifications are also intended to fall within the scope of the appended claims. All publications cited herein are incorporated by reference in their entirety.

We claim:

1. A system for automatically testing multiple SATA storage devices with multiple motherboards, the system comprising:

an automated selector comprising:
a controller adapted to receive a testing instruction and transmit the received testing instruction;
a mainboard in communication with the controller, the mainboard comprising:
a logic device to receive the testing instruction from the controller; and
a switch for pairing and unpairing motherboards with SATA storage devices;

wherein, based on the testing instruction, the automated selector is adapted to:
automatically pair a first storage device with a first motherboard ("first pair");
automatically pair a second storage device with a second motherboard ("second pair");
simultaneously test the first pair and second pair, based on the testing instruction;
automatically unpair the first storage device from the first motherboard;
automatically unpair the second storage device from the second motherboard;
automatically pair the second storage device with the first motherboard ("third pair");
automatically pair the first storage device with the second motherboard ("fourth pair");
simultaneously test the third pair and fourth pair, based on the testing instruction; and
provide test results data relating to one or more of the testing of the first pair, second pair, third pair, or fourth pair.

2. The system of claim 1, further comprising:
a first SATA storage device and a second SATA storage device; and
a first motherboard and second motherboard,
wherein the first storage device, second storage device, first motherboard, and second motherboard are connected to the mainboard.

3. The system of claim 2, wherein the automated selector comprises an enclosure and the first storage device, second storage device, controller, mainboard and switch are enclosed within the enclosure.

4. The system of claim 1, wherein the switch comprises a cross-point integrated circuit adapted to connect multiple motherboards to multiple SATA storage devices.

5. The system of claim 1, wherein the controller receives the testing instruction and causes the switch to execute the instruction.

6. The system of claim 1, wherein the controller is a single circuit board computer.

7. The system of claim 1, wherein the controller is adapted to provide a control interface to a user and to execute a command received from the user.

8. The system according to claim 1, wherein the logic device comprises a complex programmable logic device comprising a control status register adapted to the testing instruction received from the controller.

9. The system according to claim 8, wherein said logic device is adapted to schedule any number of tests, based on the testing instructions, where a total test time is minimized.

10. The system of claim 1, further comprising a test automation server in communication with a test database and the automated selector, the test automation server adapted to provide the testing instruction to the controller of the automated selector.

11. The system of claim 9, wherein the test results database is adapted to store the test results data or test instruction.

12. A computer-implemented method of testing computing equipment comprising:
connecting a first SATA hard drive, a second SATA hard drive, a first motherboard, and a second motherboard to an automated selector;
automatically pairing, by the automated selector, the first SATA hard drive to the first motherboard and executing first configuration testing;
automatically pairing, by the automated selector, the second SATA hard drive to the second motherboard and executing second configuration testing;
upon completion of the first configuration testing and the second configuration testing:
automatically unpairing, by the automated selector, the first SATA hard drive from the first motherboard;
automatically unpairing, by the automated selector, the second SATA hard drive from the second motherboard;
automatically pairing, by the automated selector, the second SATA hard drive to the first motherboard and executing third configuration testing;
automatically pairing, by the automated selector, the first SATA hard drive to the second motherboard and executing fourth configuration testing; and
reporting, by the automated selector, testing results data of one or more of the first configuration testing, second configuration testing, third configuration testing and fourth configuration testing.

13. A method according to claim 12, wherein the first configuration testing and second configuration testing are executed simultaneously.

14. A method according to claim 13, wherein the third configuration testing and fourth configuration testing are executed simultaneously.

15. A method according to claim 12, further comprising:
connecting a third SATA hard drive, a fourth SATA hard drive, a third motherboard and a fourth motherboard to the automated selector;
automatically pairing, by the automated selector, the third SATA hard drive to the third motherboard and executing fifth configuration testing;
automatically pairing, by the automated selector, the fourth SATA hard drive to the fourth motherboard and executing sixth configuration testing;
upon completion of the first configuration testing and the second configuration testing:
automatically unpairing, by the automated selector, the fifth SATA hard drive from the third motherboard;
automatically unpairing, by the automated selector, the sixth SATA hard drive from the fourth motherboard;
automatically pairing, by the automated selector, the fourth SATA hard drive to the third motherboard and executing seventh configuration testing;
automatically pairing, by the automated selector, the third SATA hard drive to the fourth motherboard and executing eighth configuration testing.

16. A method according to claim 15, wherein the first configuration testing, second configuration testing, fifth configuration testing, and sixth configuration testing are executed simultaneously and wherein the third configuration testing, fourth configuration testing, seventh configuration testing, and eighth configuration testing are executed simultaneously.

17. A method according to claim 12, wherein configuration testing is selected from the group consisting of: a full drive format of a hard drive; installing and booting from an operating system on a paired hard drive; creating and restoring an image of a hard drive; and measuring a speed of reading and writing to and from a hard drive.

18. A method according to claim 12, wherein said unpairing is only allowed when a configuration test is complete.

19. A method according to claim 12, wherein said testing results data is provided to a testing database and is viewable by an operator using a web interface.

20. A method according to claim 12, wherein the automated selector schedules configuration testing to minimize a total test time.

* * * * *